United States Patent
Bradford

(10) Patent No.: US 6,869,118 B2
(45) Date of Patent: Mar. 22, 2005

(54) ILLUMINATED IMPLEMENT APPARATUS

(76) Inventor: Alfreda B. Bradford, P.O. Box 461, Glenside, PA (US) 19038

( * ) Notice: Subject to any disclaimer, the term of this patent is extended or adjusted under 35 U.S.C. 154(b) by 0 days.

(21) Appl. No.: 10/299,561

(22) Filed: Nov. 19, 2002

(65) Prior Publication Data

US 2003/0094823 A1 May 22, 2003

Related U.S. Application Data

(60) Provisional application No. 60/331,584, filed on Nov. 20, 2001.

(51) Int. Cl.[7] .............................. F21V 33/00; E01H 5/02
(52) U.S. Cl. ......................... 294/51; 294/54.5; 362/109
(58) Field of Search ............................ 294/2, 51, 54.5, 294/55; 7/114–116; 15/105; 362/119, 120, 109; 37/265, 285

(56) References Cited

U.S. PATENT DOCUMENTS

| | | |
|---|---|---|
| 3,976,564 A | 8/1976 | Holder |
| 4,048,735 A * | 9/1977 | Brunty .......................... 37/434 |
| 4,662,947 A * | 5/1987 | Hopkins ......................... 134/6 |
| 5,129,696 A | 7/1992 | Underwood |
| 6,003,916 A | 12/1999 | Chalmers |
| 6,050,698 A | 4/2000 | Lee |
| 6,260,980 B1 | 7/2001 | Ping |

* cited by examiner

*Primary Examiner*—Dean J. Kramer

(57) ABSTRACT

An illuminated implement apparatus includes a handle portion and a working member support portion connected to the handle portion. The working member support portion includes a transverse support portion connected to the handle portion and a pair of longitudinal support portions connected perpendicularly to ends of the transverse support portion. First and second working members are connected to the longitudinal support portions. A pair of lamp assemblies are connected to distal ends of the longitudinal support portions. The lamp assemblies direct illumination to a working surface. A switch assembly is housed in the handle portion and controls the lamp assemblies. A battery assembly is housed in the handle portion and powers the lamp assemblies. First and second first heating elements are contained in the respective first and second working members. The first and second working members can be in the form of shovel blades or scoops.

19 Claims, 3 Drawing Sheets

ILLUMINATED IMPLEMENT APPARATUS

CROSS-REFERENCE TO RELATED APPLICATION

This application claims priority based upon my copending Provisional application U.S. Ser. No. 60/331,584; filed Nov. 20, 2001.

BACKGROUND OF THE INVENTION

1. Field of the Invention

The present invention relates generally to hand-held implements, and, more particularly, to hand-held implements that include a source of illumination.

2. Description of the Prior Art

It is well known to provide hand-held implements with a source of illumination so that work that is being done by the hand-held implement can be illuminated. In this respect, throughout the years, a number of innovations have been developed relating to illuminated hand-held implements, and the following U.S. patents are representative of some of those innovations: U.S. Pat. Nos. 3,976,564, 5,129,696, 6,003,916, 6,050,698, and 6,260,980.

More specifically, U.S. Pat. No. 3,976,564 discloses a shovel-like device which includes a source of illumination built into the handle of the device. The blade portion of the implement and the handle are formed as an integrated structure. There are no features present for readily separating the blade portion from the handle. There are occasions, however, when it may be desirable to readily detach a shovel blade from its handle. Such an occasion may be when a shovel is used to move snow and ice away from the front of a vehicle tire, and after the snow and ice is removed from the vehicle tire, to separate the handle from the shovel blade and leave the shovel blade wedged under the tire to provide added traction for the tire over a road surface. In this respect, it would be desirable if a shovel implement were provided which includes a shovel blade that is readily detachable from and reattachable to handle-operated portions of the shovel implement.

U.S. Pat. No. 5,129,696 discloses an illuminated hand-held carpet stretching implement that has telescopic portions. This device is of no use in performing a shovel function. However, with respect to a shovel implement which includes a shovel blade that is readily detachable from and reattachable to handle-operated portions of the shovel implement, it would be desirable is such detachment and reattachment of the shovel blade could be carried out using telescopic members.

U.S. Pat. No. 6,003,916 discloses a snow shovel that includes a shovel blade that has a blade heater provided by heating wires within the shovel blade. The heater is battery powered. However, similar to U.S. Pat. No. 3,976,564 discussed above, the blade portion of the shovel and the handle are formed as an integrated structure. There are no features present for readily separating the blade portion from the handle. As explained above, it would be desirable if a shovel implement were provided which includes a shovel blade that is readily detachable from and reattachable to handle-operated portions of the shovel implement. The battery-powered, heated-blade feature is also desirable.

As stated above, each of U.S. Pat. No. 3,976,564 and U.S. Pat. No. 6,003,916 discloses a shovel blade. Also, as stated above, it would be desirable if a shovel blade that is used for clearing snow and ice away from a vehicle tire could also be used to improve traction of the vehicle tire over a road surface. It is noted that the respective shovel blades in U.S. Pat. No. 3,976,564 and U.S. Pat. No. 6,003,916 do not conform to the shape of a vehicle tire. In this respect, to improve traction of a vehicle tire over a road surface using a shovel blade, it would be desirable if the shovel blade were adapted to conform to a portion of the shape of the tire.

As a matter of interest, U.S. Pat. No. 6,050,698 discloses a screwdriver which has a flashlight; and U.S. Pat. No. 6,260,980 discloses an illuminated pick-up tool.

Still other features would be desirable in an illuminated implement apparatus, especially an illuminated snow shovel apparatus. For example, when the shovel blade is used to improve the traction of a tire over a road surface, it would be desirable if the bottom of the shovel blade included a rough bottom surface. Such a rough bottom surface would prevent slippage between the shovel blade and the road surface itself.

Generally, a shovel has a single blade and a single handle. Under certain circumstances, it may be desirable to provide two shovel blades, extending longitudinally with respect to each other, and supported by a single handle.

Thus, while the foregoing body of prior art indicates it to be well known to use an illuminated hand-held implement, the prior art described above does not teach or suggest an illuminated implement apparatus which has the following combination of desirable features: (1) provides a shovel implement which includes a shovel blade that is readily detachable from and reattachable to handle-operated portions of the shovel implement; (2) provides telescopic members for detachment and reattachment of the shovel blade for ultimate support by the handle; (3) provides a shovel blade which is adapted to conform to a portion of the shape of the tire; (4) provides a battery-powered, heated blade; (5) provides the shovel blade with a rough bottom surface; and (6) provides two shovel blades, extending longitudinally with respect to each other, and ultimately supported by a single handle. The foregoing desired characteristics are provided by the unique illuminated implement apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an illuminated implement apparatus which includes a handle portion and a working member support portion connected to the handle portion. A first working member is connected to the working member support portion, and at least one lamp assembly is connected to the working member support portion. The lamp assembly directs illumination to a working surface. A switch assembly is housed in the handle portion and controls the lamp assembly. A battery assembly is housed in the handle portion and powers the lamp assembly.

The working member support portion includes a transverse support portion connected to the handle portion and a pair of longitudinal support portions connected perpendicularly to ends of the transverse support portion. The first working member is supported by the longitudinal support portions and is positioned between the longitudinal support portions.

Preferably, a pair of lamp assemblies are provided, wherein a respective lamp assembly is located at a distal end of a respective longitudinal support portion.

Preferably, the first working member includes first member-to-support connectors for connection with the longitudinal support portions. The longitudinal support portions are telescopically received in the first member-to-support connectors. The first member-to-support connectors are tubular in shape, and the longitudinal support portions are cylindrical in shape and are telescopically received in the tubular first member-to-support connectors.

First lock means are attached to the longitudinal support portions for locking the first working member on the longitudinal support portions. The first lock means can include spring-biased first lock pins received in complementary first pin-reception channels in the first member-to-support connectors.

In addition, a first heating element can be contained within the first working member and is electrically connected to the switch assembly. Also, a first rough bottom surface is located on the first working member. The first heating element helps melt snow and ice so that they don't adhere to the first working member.

Also, a second working member can be connected to the longitudinal support portions, distal to the first working member and the handle portion. The first working member is located between the second working member and the handle portion. The second working member includes second member-to-support connectors for connection with the longitudinal support portions. The longitudinal support portions are telescopically received in the second member-to-support connectors. The second member-to-support connectors are tubular in shape, and the longitudinal support portions are cylindrical in shape and are telescopically received in the tubular second member-to-support connectors.

Second lock means are attached to the longitudinal support portions for locking the second working member on the longitudinal support portions. The second lock means include spring-biased second lock pins received in complementary second pin-reception channels in the second member-to-support connectors.

Also, a second heating element can be contained within the second working member and is electrically connected to the switch assembly. A second rough bottom surface is located on the second working member. The second heating element helps melt snow and ice so that they don't adhere to the second working member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminated implement apparatus which has all of the advantages of the prior art and none of the disadvantages.

It is another object of the present invention to provide a new and improved illuminated implement apparatus which may be easily and efficiently manufactured and marketed.

It is a further object of the present invention to provide a new and improved illuminated implement apparatus which is of durable and reliable construction.

An even further object of the present invention is to provide a new and improved illuminated implement apparatus which is susceptible of a low cost of manufacture with regard to both materials and labor, and which accordingly is then susceptible of low prices of sale to the consuming public, thereby making such illuminated implement apparatus available to the buying public.

Still yet a further object of the present invention is to provide a new and improved illuminated implement apparatus which includes a shovel blade that is readily detachable from and reattachable to handle-operated portions of the shovel implement.

Still another object of the present invention is to provide a new and improved illuminated implement apparatus that provides telescopic members for detachment and reattachment of the shovel blade for ultimate support by the handle.

Yet another object of the present invention is to provide a new and improved illuminated implement apparatus which has a shovel blade which is adapted to conform to a portion of the shape of the tire.

Even another object of the present invention is to provide a new and improved illuminated implement apparatus that includes a battery-powered, heated shovel blade.

Still a further object of the present invention is to provide a new and improved illuminated implement apparatus which provides a shovel blade with a rough bottom surface.

Yet another object of the present invention is to provide a new and improved illuminated implement apparatus that provides two shovel blades, extending longitudinally with respect to each other, and ultimately supported by a single handle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
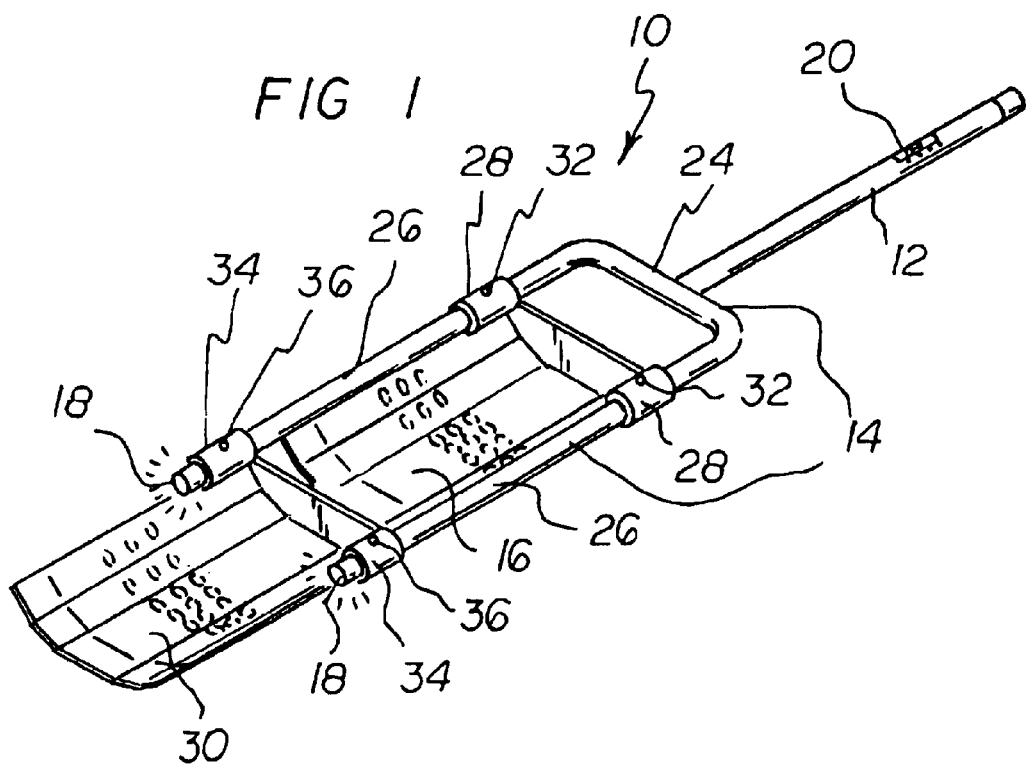
FIG. 1 is a perspective view showing a preferred embodiment of the illuminated implement apparatus of the invention which is in a form of a snow shovel.
Figure 2:
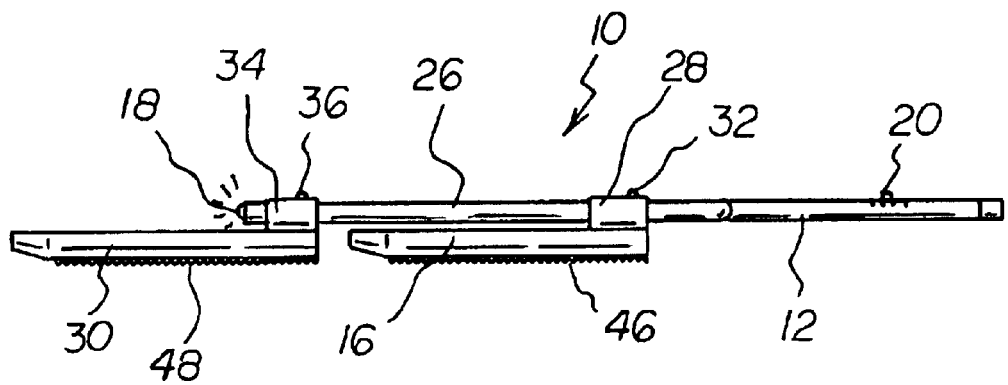
FIG. 2 is a side view of the embodiment of the illuminated implement apparatus shown in FIG. 1.
Figure 3:
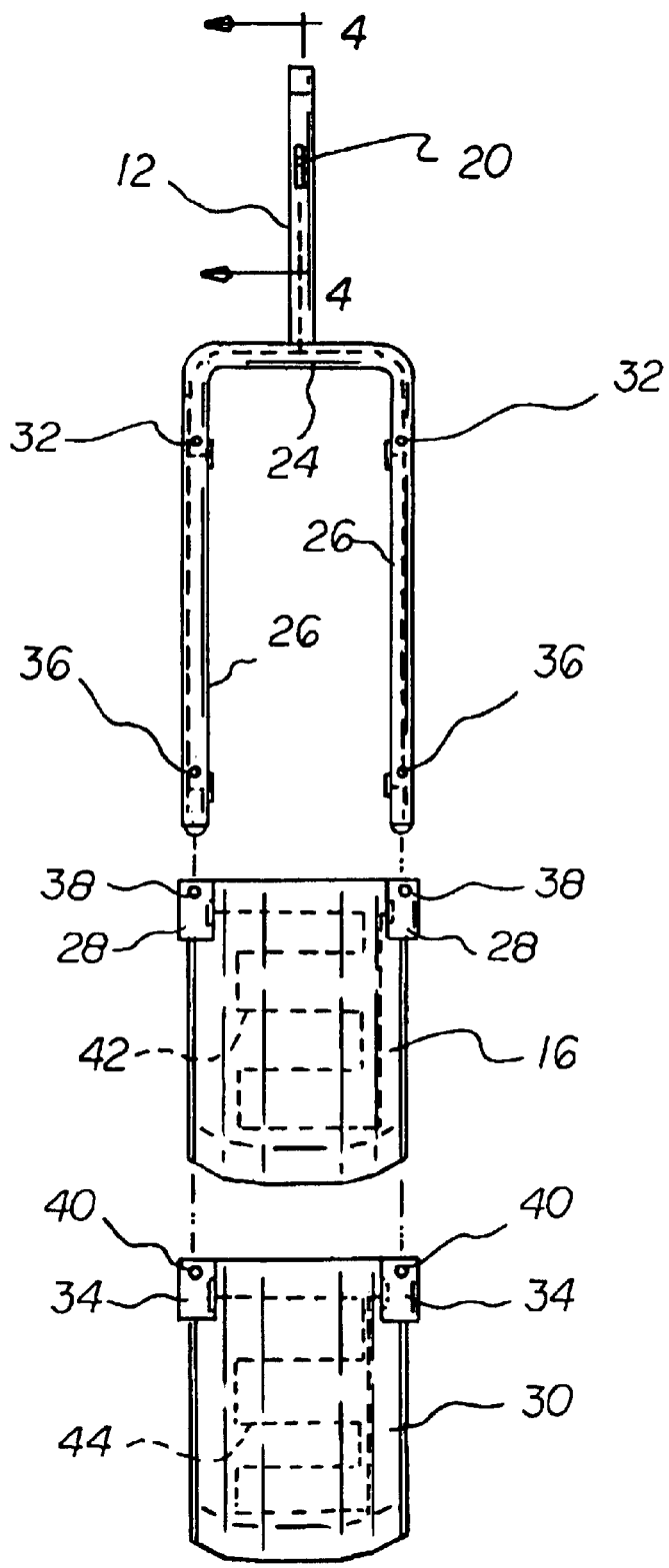
FIG. 3 is an exploded top view of the embodiment of the illuminated implement apparatus of FIGS. 2 and 3.
Figure 4:
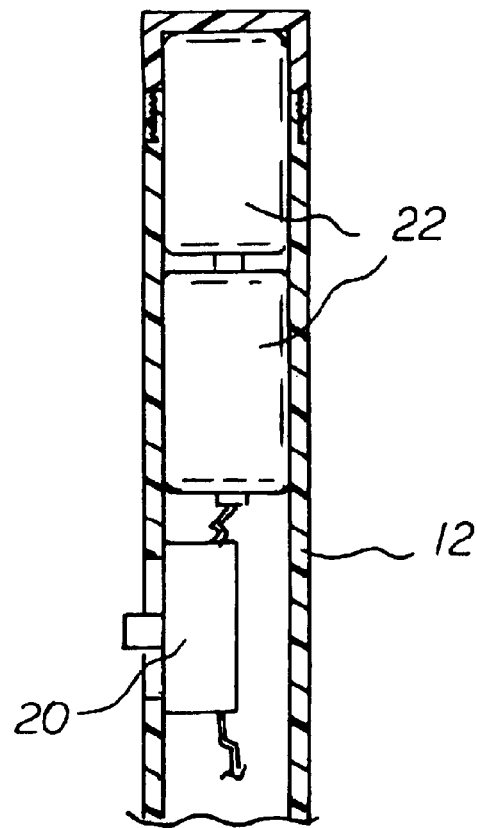
FIG. 4 is an enlarged partial cross-sectional view of the embodiment of the invention shown in FIG. 3 taken along line 4—4 thereof.

With reference to the drawings, a new and improved illuminated implement apparatus embodying the principles and concepts of the present invention will be described.

Turning to FIGS. 1–5, there is shown an exemplary embodiment of the illuminated implement apparatus of the invention generally designated by reference numeral 10. In its preferred form, illuminated implement apparatus 10 includes a handle portion 12 and a working member support portion 14 connected to the handle portion 12. A first working member 16 is connected to the working member support portion 14, and at least one lamp assembly 18 is connected to the working member support portion 14. The first working member 16 can be in the form of a shovel blade or scoop. The lamp assembly 18 directs illumination to a working surface. A switch assembly 20 is housed in the handle portion 12 and controls the lamp assembly 18. A battery assembly 22 is housed in the handle portion 12 and powers the lamp assembly 18.

The working member support portion 14 includes a transverse support portion 24 connected to the handle portion 12 and a pair of longitudinal support portions 26 connected perpendicularly to ends of the transverse support portion 24. The first working member 16 is supported by the longitudinal support portions 26 and is positioned between the longitudinal support portions 26.

Preferably, a pair of lamp assemblies 18, wherein a respective lamp assembly 18 is located at a distal end of a respective longitudinal support portion 26.

Preferably, the first working member 16 includes first member-to-support connectors 28 for connection with the longitudinal support portions 26. The longitudinal support portions 26 are telescopically received in the first member-to-support connectors 28. The first member-to-support connectors 28 are tubular in shape, and the longitudinal support portions 26 are cylindrical in shape and are telescopically received in the tubular first member-to-support connectors 28.

First lock means are attached to the longitudinal support portions 26 for locking the first working member 16 on the longitudinal support portions 26. The first lock means can include spring-biased first lock pins 32 received in complementary first pin-reception channels 38 in the first member-to-support connectors 28.

In addition, a first heating element 42 can be contained within the first working member 16 and is electrically connected to the switch assembly 20. Also, a first rough bottom surface 46 is located on the first working member 16. The first heating element 42 helps melt snow and ice so that they don't adhere to the first working member 16.

Also, a second working member 30 can be connected to the longitudinal support portions 26, distal to the first working member 16 and the handle portion 12. The second working member 30 can be in the form of a shovel blade or a scoop. The first working member 16 is located between the second working member 30 and the handle portion 12. The second working member 30 includes second member-to-support connectors 34 for connection with the longitudinal support portions 26. The longitudinal support portions 26 are telescopically received in the second member-to-support connectors 34. The second member-to-support connectors 34 are tubular in shape, and the longitudinal support portions 26 are cylindrical in shape and are telescopically received in the tubular second member-to-support connectors 34.

Second lock means are attached to the longitudinal support portions 26 for locking the second working member 30 on the longitudinal support portions 26. The second lock means include spring-biased second lock pins 36 received in complementary second pin-reception channels 40 in the second member-to-support connectors 34.

Also, a second heating element 44 can be contained within the second working member 30 and is electrically connected to the switch assembly 20. A second rough bottom surface 48 is located on the second working member 30. The second heating element 44 helps melt snow and ice so that they don't adhere to the second working member 30.

The illuminated implement apparatus 10 of the invention can be employed in a number of ways. As shown in the drawings, the first working member 16 and the second working member 30 can be in the form of shovel blades. In this respect, the illuminated implement apparatus 10 is an illuminated shovel (Lite Shovel). Alternatively, the illuminated implement apparatus 10 can be in the form of an illuminated broom (Lite Broom). In general, an illuminated implement apparatus 10 of the invention can be used to provide extra visibility, especially when there is very little accessible natural or artificial light. In addition, the illuminated implement apparatus 10 provides additional comfort for persons having sight impairments made worse by dim light conditions.

In the embodiment of the invention shown in the drawings, the first member-to-support connectors 28 are fixed to the longitudinal support portions 26 by the first lock pins 32 which extend through the first pin-reception channels 38. Also, the second member-to-support connectors 34 are fixed to the longitudinal support portions 26 by the second lock pins 36 which extend through the second pin-reception channels 40. In use, the handle portion 12 is grasped by a user, the lamp assemblies 18 can be turned on using the switch assembly 20, and the second working member 30 can be used as shovel, with the lamp assemblies 18 illuminating a surface is shovelled.

Figure 5:
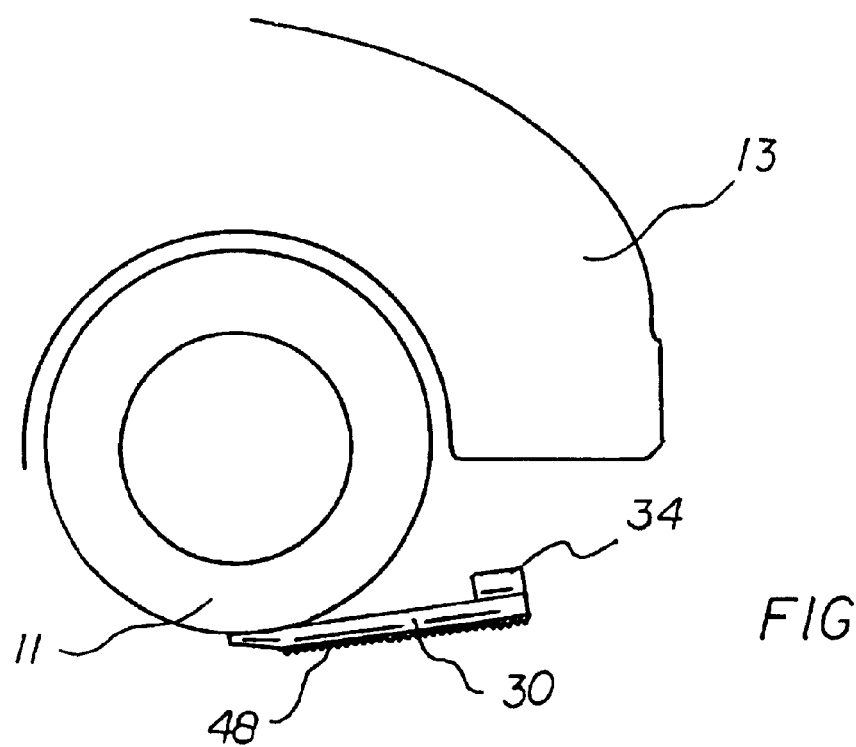
FIG. 5 is a side view of a portion of the embodiment of the invention shown in FIGS. 1–4 being used to assist in traction for a tire of a motor vehicle.

Alternatively, as shown in FIG. 5, the second working member 30 can be separated from the longitudinal support portions 26 to be used under a first tire 11 of a motor vehicle 13. More specifically, the leading edge of the second working member 30 can be wedged under the front of the first tire 11. Then, the second lock pins 36 can be pushed into the longitudinal support portions 26 so that they disengage from the second pin-reception channels 40 in the second member-to-support connectors 34. Then, the longitudinal support portions 26 can be pulled out from the second member-to-support connectors 34, leaving the second working member 30 wedged under the first tire 11. The second rough bottom surface 48 can further assist in providing traction between the first tire 11 and an icy road surface.

If desired, the first working member 16 can be released from its intermediate position along the longitudinal support portions 26 shown in the drawings by pushing down on the first lock pins 32 so that they disengage from the first pin-reception channels 38 in the first member-to-support connectors 28. As a result, the first working member 16 can be slid down the longitudinal support portions 26, and the first working member 16 can be locked at the end of the longitudinal support portions 26 by permitting the second lock pins 36 to engage the first pin-reception channels 38 in the first member-to-support connectors 28. When this is done, the first working member 16 can be used as a snow shovel.

Moreover, in this end-of-longitudinal-support-portions position, the leading edge of the first working member 16 can be wedged under a second tire 11. Then, the first working member 16 can be released from the longitudinal support portions 26 so that the first working member 16 can also help to improve traction between the second tire 11 and the road surface. The first rough bottom surface 46 can further assist in providing traction between the second tire 11 and an icy road surface.

The first heating element 42 and the second heating element 44 can be selectively turned on or off by the switch assembly 20 independently of the operation of the lamp assemblies 18. More specifically, the switch assembly 20 controls electrical circuitry that provides for the following four sets of electrical conditions. First, the lamp assemblies 18 are "off", and the heating elements 42,44 are "off". Second, the lamp assemblies 18 are "on", and the heating elements 42,44 are "off". Third, the lamp assemblies 18 are "off", and the heating elements 42,44 are "on". Fourth, the lamp assemblies 18 are "on", and the heating elements 42,44 are "on".

The lamp assemblies 18 can be incandescent or florescent, and the lamp assemblies 18 can be housed in a heavy duty, water proof casing. The components of the illuminated implement apparatus 10 can be purchased separately and retrofitted together, or embodiments of the invention can be provided as a pre-manufactured apparatus.

The components of the illuminated implement apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved illuminated implement apparatus that is low in cost, relatively simple in design and operation, and which advantageously includes a shovel blade that is readily detachable from and reattachable to handle-operated portions of the shovel implement. With the invention, an illuminated implement apparatus provides telescopic members for detachment and reattachment of the shovel blade for ultimate support by the handle. With the invention, an illuminated implement apparatus provides a shovel blade which is adapted to conform to a portion of the shape of the tire. With the invention, an illuminated implement apparatus provides a battery-powered, heated-blade. With the invention, an illuminated implement apparatus provides the shovel blade with a rough bottom surface. With the invention, an illuminated implement apparatus provides two shovel blades, extending longitudinally with respect to each other, and ultimately supported by a single handle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. An illuminated implement apparatus, comprising:

a handle portion, a working member support portion connected to said handle portion, wherein said working member support portion includes a transverse support portion connected to said handle portion and a pair, of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, said apparatus further including a pair of lamp assemblies, wherein each lamp assembly is located at a distal end of a respective longitudinal support portion.

2. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, wherein said first working member is adapted to receive a vehicle tire.

3. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, wherein said first working member includes first member-to-support connectors for connection with said longitudinal support portions.

4. The apparatus of claim 3 wherein said longitudinal support portions are telescopically received in said first member-to-support connectors.

5. The apparatus of claim 3 wherein:

said first member-to-support connectors are tubular in shape, and said longitudinal support portions are cylindrical in shape and are telescopically received in said tubular first member-to-support connectors.

6. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lame switch, housed in said handle portion, for controlling said lamp assembly, and a battery assembly, housed in said handle portion, for powering said lamp assembly, said apparatus further including:

first look means attached to said longitudinal support portions for locking said first working member on said longitudinal support portions.

7. The apparatus of claim 6 wherein said first working member includes first member-to-support connectors for connection with said longitudinal support portions, and wherein said first lock means include spring-biased first lock pins received in complementary first pin-reception channels in said first member-to-support connectors.

8. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, said apparatus further including:

a first heating element contained within said first working member and electrically connected to said lamp switch.

9. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, said apparatus further including:

a first rough bottom surface located on said first working member.

10. An illuminated implement apparatus, comprising:

a handle portion, a working member support portion connected to said handle portion, wherein said working member support portion includes a transverse support portion connected to said handle portion, and a pair of longitudinal support portions connected perpendicularly to ends of said transverse support portion, a first working member connected to said longitudinal support portions and positioned between said longitudinal support portions, and at least one lamp assembly connected to at least one of said longitudinal support portions, wherein said lamp assembly directs illumination to a working surface, a lamp switch, housed in said handle portion, for controlling said lamp assembly, and a battery assembly, housed in said handle portion, for powering said lamp assembly, said apparatus further including:

a second working member connected to said longitudinal support portions, distal to said first working member and said handle portion.

11. The apparatus of claim 10 wherein said second working member is adapted for receiving a vehicle tire.

12. The apparatus of claim 10 wherein said first working member is located between said second working member and said handle portion.

13. The apparatus of claim 10 wherein said second working member includes second member-to-support connectors for connection with said longitudinal support portions.

14. The apparatus of claim 13 wherein said longitudinal support portions are telescopically received in said second member-to-support connectors.

15. The apparatus of claim 13 wherein:
said second member-to-support connectors are tubular in shape, and
said longitudinal support portions are cylindrical in shape and are telescopically received in said tubular second member-to-support connectors.

16. The apparatus of claim 10 further including:
second lock means attached to said longitudinal support portions for locking said second working member on said longitudinal support portions.

17. The apparatus of claim 16 wherein said second working member includes second member-to-support connectors for connection with said longitudinal support portions, and
wherein said second lock means include spring-biased second lock pins received in complementary second pin-reception channels in said second member-to-support connectors.

18. The apparatus of claim 10, further including:
a second heating element contained within said second working member and electrically connected to said lamp switch.

19. The apparatus of claim 10, further including:
a second rough bottom surface located on said second working member.

* * * * *